United States Patent [19]

Vihervaara

[11] Patent Number: 5,578,169
[45] Date of Patent: Nov. 26, 1996

[54] REDUCING LEVEL OF INTERFERENCE CHEMICALS IN WATER CIRCULATION OF WOOD-BASED FIBRE SUSPENSION PROCESSES

[75] Inventor: Tapio Vihervaara, Turku, Finland

[73] Assignee: Raision Tehtaat OY AB, Finland

[21] Appl. No.: 232,248

[22] PCT Filed: Nov. 9, 1992

[86] PCT No.: PCT/FI92/00303

§ 371 Date: May 5, 1994

§ 102(e) Date: May 5, 1994

[87] PCT Pub. No.: WO93/10305

PCT Pub. Date: May 27, 1993

[30] Foreign Application Priority Data

Nov. 11, 1991 [FI] Finland ................................ 915310

[51] Int. Cl.$^6$ .................................................. D21H 21/06
[52] U.S. Cl. ............................ 162/175; 162/183; 162/190
[58] Field of Search .................................. 162/175, 183, 162/190

[56] References Cited

U.S. PATENT DOCUMENTS

| 2,876,217 | 3/1959 | Paschall | 260/233.3 |
| 3,842,005 | 10/1974 | Moser et al. | 162/175 |
| 4,613,407 | 9/1986 | Huchette et al. | 162/175 |
| 4,840,705 | 6/1989 | Ikeda et al. | 162/175 |
| 5,122,231 | 6/1992 | Anderson | 162/175 |

FOREIGN PATENT DOCUMENTS

| 2935338 | 1/1980 | Germany . |
| 3107739 | 3/1982 | Germany . |
| 2071128 | 2/1981 | United Kingdom . |
| 2063282 | 2/1981 | United Kingdom . |

*Primary Examiner*—Peter Chin
*Attorney, Agent, or Firm*—Pollock, Vande Sande & Priddy

[57] ABSTRACT

The invention relates to a method for reducing the amount of interference substances in the water circulations of processes involving wood-based fibre suspensions by binding the disturbance substances to the fibres by means of cationic starch. The amount of the said starch added to the fibre suspension is approximately 0.04–0.5% of the fibre weight.

6 Claims, No Drawings

REDUCING LEVEL OF INTERFERENCE CHEMICALS IN WATER CIRCULATION OF WOOD-BASED FIBRE SUSPENSION PROCESSES

Several changes have taken place during the past few years in the water circulations of processes dealing with wood-based fibre suspensions, especially in the case of water circulations connected to papermaking:

Environmental and social pressures call for reductions in effluents to the water system. This leads to shortened water circulations and their partial closing off.

The need to save expensive fibre raw material calls for increasing use of recycled fibre. The use of recycled fibre has increased significantly and there are countries where the legislation makes it compulsory to use such material. For the same reason the use of groundwood and other mechanical pulps is on the rise.

As a means of cutting costs, increasingly higher proportions of the more expensive filler and coater pigments in the manufacturing of paper and board are being replaced by $CaCO_3$. This requires a shift over from acidic processes to neutral processes.

Due to all the above reasons, increasing amounts of what may be called interference chemicals are becoming concentrated in the process water circulations. The interference materials are chemically a highly heterogeneous group of compounds. Typical examples of these are wood extracts, neutral or anionically charged, substances in dissolved or colloidal form arising during cellulose production or originating from the wood.

In addition, coating binder residues, synthetic polymers, anionic emulgators, etc., end up in the water circulation of the paper machine in the course of manufacturing of coated papers.

De-inked recycled material can never equal virgin fibre raw material in terms of purity as it always contains de-inking chemical and ink residues.

The aforementioned interference substances impair i.a. the runnability of the paper machine by increasing the frequency of web breaks, by blocking up the wires, by contaminating the press rolls and by reducing paper quality in terms of increasing number of holes. The interference substances reduce retention by reducing the efficiency of the available retention system as impurities bind to the retention substance and thereby bind part of the functional groups of the said retention substance.

Broadly defined, all chemicals used in the above processes become interference substances once they become concentrated in the water circulation. In its more emphasised form, this problem occurs expressly in paper machines.

Traditionally, paper manufacturers have used alum to combat the effect of interference substances. Alum efficiently binds interference substances to the fibres and thereby inactivates them. The effect of alum is based on the fact that within the pH range of 4.2–5.0 alum forms an abundance of positively charged cations which bind and neutralise mainly negatively charged interference substances. In neutral paper manufacturing processes alum is ineffective and this is why other solutions must be resorted to.

Another method is to use talc. Talc binds impurities to its surface and in favourable conditions the interference substances leave the system along with the paper web. However, talc does not work very well if the concentration of impurities is high.

Dispersing agents are used with the purpose of dispersing the interference substances into the circulation water. A shortening of the water circulations leads to situations in which the concentrations of the interference substances rise to high levels in the circulation water, which in turn reduces retention and on the other hand makes it possible for fresh accumulations to occur, thereby reducing product quality.

As alum is a cationic product, there is a trend in neutral process papermaking to replace it with short-chained cationic polymers; the best known among these are the poly-DADMAC products (i.e. poly-diallyl-dimethylammonium-chloride). These polymers typically possess a high cationic charge (meqv/g) and their molecular weight is relatively low when compared to synthetic products traditionally used as retention polymers. Corresponding other cationic binding chemicals include various polyamine polymers, etc. It is believed that the high cationic short-chained polymers function by binding the interference substances to the fibre material and consequently the interference substances leave the system continuously along with the fibres. Products of this type are added to the system at an early enough stage to prevent binder substance particles, for instance, from forming harmful agglomerations (white pitch).

There are several ways to measure interference substances in the circulating waters of paper machines and the like but all are more or less indirect. One of these methods is based on determining the charge state (the interference substances are generally negatively charged); i.e. the higher the negative charge, the higher the concentration of interference substances. When added to the system, the highly cationic, short-chained polymers reduce the negative charge (=the amount of negatively charged colloids of interference substances). This change in charge state also depicts the change in the concentration of interference substances.

In laboratory conditions, the efficiency of cationic polymers can be measured by determining the residual turbidity of the fibre material (mechanical stock, reject stock, etc.) filtered through the wire or filter paper before and after chemical treatment. It is also possible to measure the chemical oxygen demand (COD) or the conductivity of the system.

The efficient dosage of the said substances depends very much on the system; the dirtier the system, the higher the required dosage. Generally, dosages amounting to 0.05–0.4% of the dry weight of the fibre gives good results. In the case of paper machines, the point of dosage is typically immediately after the stock storage tank before the other chemicals are added to the system.

Starches are used in papermaking as paper strength improving component. Cationised starch in the form of stock starch or cationic surface glue binds better to the fibres and does not end up in the circulating waters of the paper machine. Thus, it reduces the COD-load of waste and circulating waters.

Surprisingly it has been observed that when the charge state of starch is raised by cationising starch ethers with 2,3-epoxy-propyl-trimethylammoniumchloride to the level of 2–3 meqv of N/g, the said highly cationised starches function in the manner of alum or a pDADMAC chemical by binding anionic colloidal substances present in papermaking regardless of whether the said substances originate from a mechanical stock or coated reject. Contrary to alum, the starches in accordance with the invention function regardless of the pH level and can thus also be used in neutral papermaking processes.

The invention is described in the light of the following comparative examples.

The examples used in the comparison are polyDADMAC (Basf: Fixiermittel, Nalco: 8674, Mobil: Certrex 340), polyimine (Basf: Polymin SK), and polyaluminiumchloride (Oulu Oy: Oulupac 180).

In all the laboratory tests conducted, the pulp was stirred for 2 minutes following the proportioning of chemicals therein after which it was filtered through a 150 μm wire screen. The filtrates were measured for their turbidity, charge state and/or chemical oxygen demand (COD).

Retention tests were conducted using a Dynamic Drainage Jar tester (TAPPI, February, 1976, Vol. 59, No. 2, pp. 67–70). The retention tests consisted of first adding the interference removing agent to the stock and allowing it to mix for 1 min 30 secs, then of adding the stock starch and allowing this to mix for 30 secs, and finally of adding the retention substance (Allied Colloids: Percol 47). Filtering was commenced 30 secs after the addition of the retention substance. The filtrates were measured for their COD values.

Turbidity was measured in TE/F units (Dr. Lange LTP 5) and the charge state was determined by titrating using a PCD-02 charge state detector (Amütek) with an 0,001N MGC (methyl glycol kitosane) solution as the titration solution. COD was determined using a test kit (Dr. Lange).

All dosages were determined as active substance per dry matter of stock.

EXAMPLE 1

Stock: coated reject, pH 4.6
Turbidity, charge state, COD.

Two batches of cationic starch differing in degree of purity were compared to commercial polyDADMAC. The cationisation degree of both was 2.7 meqv/g.

|  | Dosage % | Turbidity (1:10) | Charge state μeqv/l | COD mg/l |
|---|---|---|---|---|
| 0 |  | 45 | 1921 | 658 |
| PolyDADMAC | 0.1 | 18.8 | 1400 | 585 |
| Basf | 0.3 | 14.9 | 613 | 540 |
|  | 0.6 | 13.4 | 160 | 483 |
| Cationised | 0.1 | 18.4 | 1579 | 653 |
| starch | 0.3 | 12.9 | 871 | 603 |
| (non-purif.) | 0.6 | 15.6 | 454 | 618 |
| Cationised | 0.1 | 17.9 | 1506 | 618 |
| starch | 0.3 | 11.9 | 776 | 570 |
| (purified) | 0.6 | 13.8 | 291 | 525 |

EXAMPLE 2

Stock: Groundwood pulp, pH 7
Retention test

Points 1–3 served as comparison points for the test points 4–6 which include cationised starch (2.8 meqv/g) as the fixing agent.

Stock starch: Raisamyl 125.

| Test point | Cat.starch % | Stock starch % | Ret.agent % | COD mg/l |
|---|---|---|---|---|
| 1(0 test) | 0.0 | 0.0 | 0.0 | 3485 |
| 2 | 0.0 | 0.0 | 0.05 | 3050 |
| 3 | 0.0 | 0.5 | 0.05 | 3050 |
| 4 | 0.6 | 0.5 | 0.0 | 2715 |
| 5 | 0.3 | 0.5 | 0.05 | 2770 |
| 6 | 0.6 | 0.5 | 0.05 | 2625 |

EXAMPLE 3

Stock: TMP, pH 4.6
Turbidity, COD.

Two batches of cationic starch and two commercial polyDADMACs were compared.

| Chemical | Dosage % | Turbidity (1:10) | COD mg/l |
|---|---|---|---|
| 0 test |  | 154 | 2385 |
| PolyDADMAC 1 | 0.2 | 113 | 2325 |
| Mobil | 0.4 | 68 | 1795 |
|  | 0.6 | 44 | 1595 |
| Cationised | 0.2 | 46 | 1775 |
| starch 1 | 0.4 | 20 | 1535 |
| (2.6 meqv/g) | 0.6 | 15 | 1585 |
| Cationised | 0.2 | 33 | 1765 |
| starch 2 | 0.4 | 20 | 1595 |
| (2.8 meqv/g) | 0.6 | 13 | 1420 |
| PolyDADMAC 2 | 0.2 | 71 | 2020 |
| Basf | 0.4 | 32 | 1610 |
|  | 0.6 | 19 | 1430 |

EXAMPLE 4

Stock: MWC reject, pH 8
Turbidity, charge state, COD.

Two cationic starches and commercial polyDADMAC.

| Chemical | Dosage % | Turbidity (1:10) | Charge state μeqv/l | COD mg/l |
|---|---|---|---|---|
| 0 test |  | 288 | 2830 | 1845 |
| Cationised | 0.2 | 31 | 1620 | 1665 |
| starch 1 | 0.4 | 17 | 460 | 1550 |
| (2.8 meqv/g) |  |  |  |  |
| PolyDADMAC | 0.2 | 33 | 1200 | 1632 |
| Nalco | 0.4 | 26 | 380 | 1510 |
| Cationised | 0.2 | 29 | 1620 | 1757 |
| starch 2 | 0.4 | 18 | 690 | 1665 |
| (2.7 meqv/g) |  |  |  |  |

EXAMPLE 5

Stock: Double coated reject, ph 7.5
Turbidity, charge state.

Two cationic starches, each 2.5 meqv/g and a commercial polyDADMAC and polyaminechloride (PAC).

| Chemical | Dosage % | Turbidity (1:10) | Charge state μeqv/l |
|---|---|---|---|
| 0 test |  |  | 183 |
| Cationised | 0.03 | 86 | 135 |
| starch 1 | 0.06 | 58 | 120 |
| (non-purif.) | 0.09 | 41 | 92 |
| PolyDADMAC | 0.03 | 112 | 149 |
| Nalco | 0.06 | 68 | 113 |
|  | 0.09 | 49 | 78 |
| Cationised | 0.03 | 64 | 119 |
| starch 2 | 0.06 | 35 | 96 |
| (purified) | 0.09 | 25 | 87 |
| PAC | 0.12 | 161 | 127 |
| Oulu | 0.24 | 103 | 100 |
|  | 0.48 | 70 | 98 |

EXAMPLE 6

Stock: De-inked stock
Turbidity, COD.

Cationic starch (2.8 meqv/g) and commercial polyDADMAC.

| Chemical | Dosage % | Turbidity (1:10) | COD mg/l |
|---|---|---|---|
| 0 test |  | 383 | 438 |
| PolyDADMAC | 0.2 | 52 | 390 |
| Mobil | 0.4 | 49 | 355 |
|  | 0.6 | 85 | 348 |
| Cationised | 0.2 | 40 | 431 |

-continued

| Chemical | Dosage % | Turbidity (1:10) | COD mg/l |
|---|---|---|---|
| starch | 0.4 | 33 | 402 |
|  | 0.6 | 30 | 338 |

EXAMPLE 7

Stock: test stock mixture (50% groundwood stock+50% coated reject), pH 8.4
Turbidity
Two cationised starches and commercial polyDADMAC and polyimine.

| Chemical | Dosage % | Turbidity (1:10) |
|---|---|---|
| 0 test |  | 447 |
| PolyDADMAC | 0.15 | 90 |
| Basf | 0.2 | 63 |
|  | 0.25 | 46 |
| Cationised | 0.15 | 95 |
| starch 1 | 0.2 | 60 |
| (non-purif.) | 0.25 | 48 |
| (2.7 meqv/g) |  |  |
| Polyimine | 0.15 | 72 |
| Basf | 0.2 | 49 |
|  | 0.25 | 40 |
| Cationised | 0.15 | 65 |
| starch 2 | 0.2 | 46 |
| (purified) | 0.25 | 39 |
| (2.6 meqv/g) |  |  |

EXAMPLE 8

Stock: groundwood stock, pH 5.3
Turbidity, COD.
Two cationic starches and a commercial polyDADMAC.

| Chemical | Dosage % | Turbidity (1:10) | COD mg/l |
|---|---|---|---|
| 0 test |  | 267 | 979 |
| Cationised | 0.05 | 132 | 718 |
| starch 1 | 0.1 | 53 | 620 |
| (2.6 meqv/g) | 0.15 | 39 | 595 |
|  | 0.2 | 30 | 589 |
| PolyDADMAC | 0.05 | 187 | 807 |
| Nalco | 0.1 | 86 | 645 |
|  | 0.15 | 58 | 602 |
|  | 0.2 | 47 | 575 |
| Cationised | 0.05 | 168 | 805 |
| starch 2 | 0.1 | 68 | 660 |
| (2.1 meqv/g) | 0.15 | 46 | 604 |
|  | 0.2 | 31 | 581 |

EXAMPLE 9

Stock: Double coated reject, pH 7.5
Turbidity
Three cationised starches of different cationisation degrees and a commercial polyDADMAC.

| Chemical | Dosage % | Turbidity (1:10) |
|---|---|---|
| Cationised | 0.1 | 40 |
| starch 1 | 0.3 | 5.1 |
| (2.8 meqv/g) |  |  |
| Cationised | 0.1 | 71 |
| starch 2 | 0.3 | 32 |
| (1.8 meqv/g) |  |  |
| Cationised | 0.1 | 155 |
| starch 3 | 0.3 | 31 |
| (1.0 meqv/g) |  |  |
| PolyDADMAC | 0.1 | 57 |
| Nalco | 0.3 | 10.4 |

EXAMPLE 10

Stock: Test stock mixture (50% groundwood stock+50% coated reject ), pH 8.4
Turbidity
Three starches of different cationisation degrees.

| Chemical | Dosage % | Turbidity (1:10) |
|---|---|---|
| Cationised | 0.1 | 340 |
| starch 1 | 0.2 | 248 |
| (0.14 meqv/g) | 0.3 | 192 |
| Cationised | 0.1 | 270 |
| starch 2 | 0.2 | 190 |
| (0.57 meqv/g) | 0.3 | 135 |
| Cationised | 0.1 | 145 |
| starch 3 | 0.2 | 30 |
| (2.5 meqv/g) | 0.3 | 19 |

Based on the above test results it can be observed that the results of using a cationic starch polymer in the reduction of interference substances in water circulation fibre suspensions are of the same order as those when using polymers traditionally used for the purpose.

I claim:
1. A method for reducing the amount of anionic colloidal interference substances in the water circulation in web formation processes involving dewatering of wood-based fibre suspensions that contain added filling and sizing agents, which comprises adding cationized ammonium starch having a charge density of 1.5–3.5 meqv of N/g to the fibre suspension in an amount of approximately 0.04–0.5% of the fibre dry matter in order to fix said anionic colloidal interference substances from the circulation water to the fibres to be subjected to the web formation, and wherein said cationized ammonium starch is added at a stage preceding adding any filling and sizing agent to said fibre suspension.

2. A method as claimed in claim 1, wherein said cationized starch is a starch ether cationized with 2,3-epoxy-propyl-trimethylammoniumchloride.

3. A method as claimed in claim 2, wherein said cationized starch has a charge density of 2–3 megv of N/g.

4. A method as claimed in claim 3, wherein said cationized starch is added to the fibre suspension before the web formation stage.

5. A method as claimed in claim 1, wherein said cationized starch is added to the fibre suspension before the web formation stage.

6. A method as claimed in claim 2, wherein said cationized starch is added to the fibre suspension before the web formation stage.

* * * * *